Dec. 30, 1958      A. A. WOLF      2,866,947

SATURABLE REACTOR CONTROL CIRCUIT

Filed Oct. 5, 1956

INVENTOR.
ALFRED A. WOLF
BY
ATTORNEYS

United States Patent Office
2,866,947
Patented Dec. 30, 1958

2,866,947

SATURABLE REACTOR CONTROL CIRCUIT

Alfred A. Wolf, Dallastown, Pa., assignor, by mesne assignments, to the United States of America as represented by the Secretary of the Navy Application October 5, 1956, Serial No. 614,329

2 Claims. (Cl. 323—89)

The present invention relates to a motor control circuit and more particularly to a passive link between a small transmitter and a load consisting of one or more motors.

It is often desirable to repeat a signal from a transmitter with a minimum of current drain from the transmitter, and yet provide the necessary power for full torque on one or more motors. The present invention is well suited for this purpose and when a receiver is connected to the output of the device herein disclosed, the receiver will accurately repeat the angular position of the transmitter.

Various electronic control systems have been employed in the past to control the speed and direction of rotation of various motors and many are well known in the servomechanism art. However, most of these circuits require the use of electronic tubes and are often complicated in nature. Also, the use of fragile tubes creates an additional problem in that extra care is required in mounting them so that they will not become broken or damaged by excessive shock and vibration.

The present invention not only discloses a circuit that is simple to construct, but the finished assembly can readily be placed in an enclosure and potted with one of the potting compounds well known in the art. The basic circuit consists of a saturable reactor, a coupling transformer, a pair of selenium rectifiers, and a source of A. C. voltage. The selenium rectifiers are arranged in the circuit such that when no signal is present on the terminals of the saturable reactor the current flowing through the selenium rectifiers is equal and of opposite polarity and no voltage will appear across the output terminals of the coupling transformer. However, when a signal is placed on the terminals of the saturable reactor it will cause unequal currents to flow through the selenium rectifiers and an A. C. voltage will be across the output terminals of the coupling transformer. The magnitude and polarity of this voltage will be proportional to the magnitude and polarity of the signal.

It is, therefore, a general object of the present invention to provide an improved electronic control circuit for controlling the operation of one or more motors.

Another object of the invention is to provide a passive link between a transmitter and a load of one or more motors whereby a minimum of current is drawn from the transmitter and yet the necessary power is provided for full torque of the motors.

Other objects and advantages of the present invention will be readily appreciated as the same becomes better understood by reference to the following detailed description when considered in connection with the accompanying drawing wherein.

Figure 1:
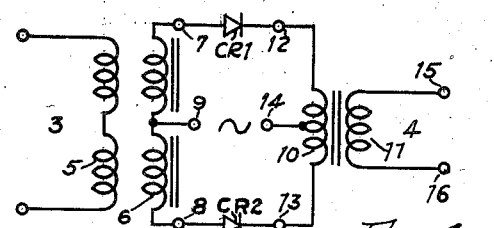
Figure 1 is a circuit diagram showing the basic circuit of the repeater.

Referring now to the drawing wherein like reference characters designate like or corresponding parts, there is shown in Figure 1 a basic circuit of the present invention having a saturable reactor 3, a coupling transformer 4, and selenium rectifiers CR1 and CR2. The saturable reactor 3 has a signal winding 5 and a secondary winding 6 which has two output terminals 7 and 8 and a common terminal 9. The selenium rectifiers CR1 and CR2 are connected in opposed relation, one each to the output terminals of the secondary winding 6. The coupling transformer 4 has the customary primary and secondary windings, 10 and 11, respectively, and the primary winding 10 has two input terminals 12 and 13 and a center-tapped terminal 14.

An alternating current is impressed across terminals 9 and 14, and it can be seen that when there is no signal on the signal winding 5 the currents flowing through selenium rectifiers CR1 and CR2 will be equal and of opposite polarity and will cancel in the coupling transformer 4, and consequently no voltage will be applied on transformer output terminals 15 and 16. However, when a signal is received by the signal winding 5, unequal currents will flow through the rectifiers and an alternating current voltage will be across output terminals 15 and 16. The magnitude and polarity of this voltage will be proportional to the magnitude and polarity of the signal on winding 5, and thus it can be seen that a signal can be amplified to control a load of one or more motors that can be connected to terminals 15 and 16 and that a minimum amount of current is drained from a transmitter that would supply the signals to the signal winding 5.

Figure 2:
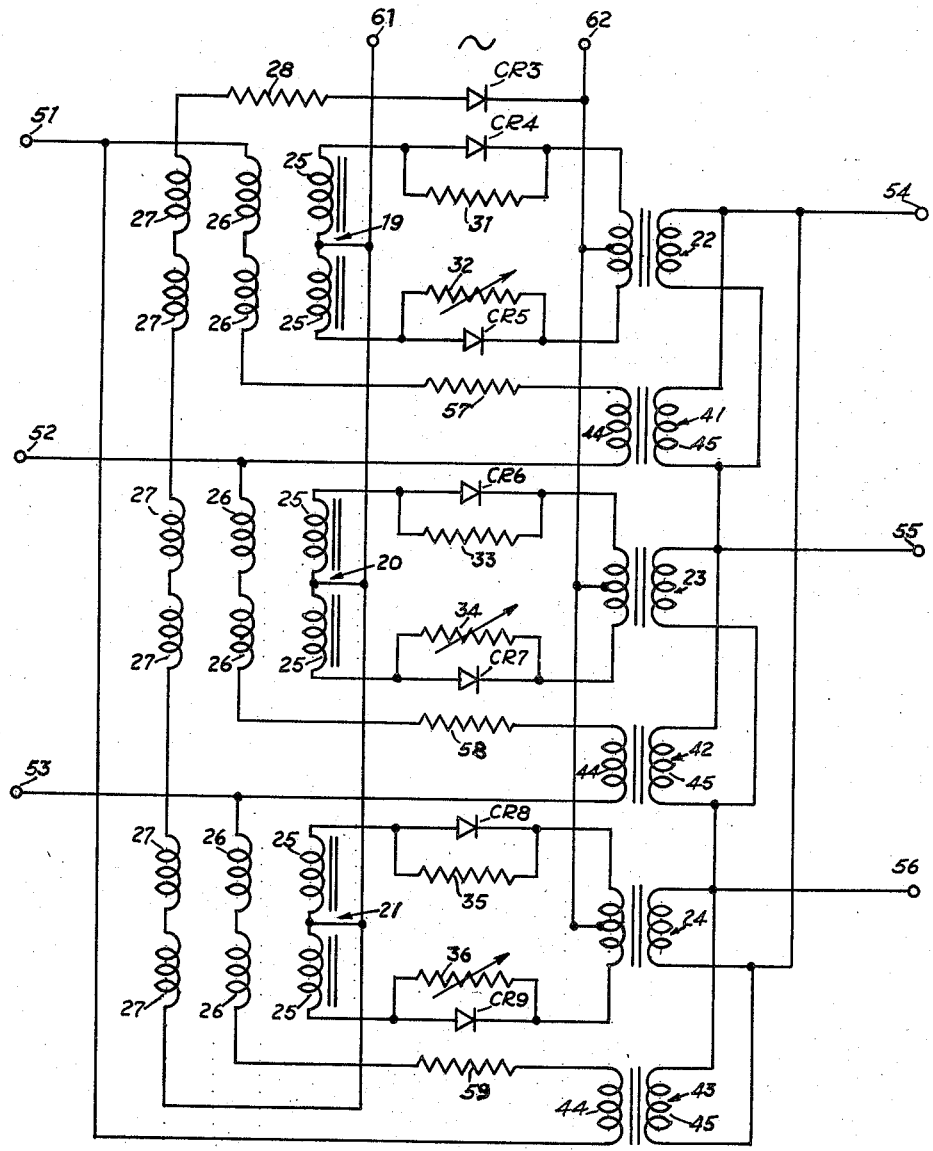
Figure 2 is a circuit diagram showing a preferred arrangement of the invention.

Referring now to Figure 2 of the drawing, an embodiment of a complete passive repeater is shown which consists primarily of three of the basic circuits shown in Figure 1. As illustrated in Figure 2, reference numerals 19, 20, and 21 refer to saturable reactors, and 22, 23, and 24 refer to coupling transformers. The saturable reactors, by way of illustration, might consist of a core made of 29 gage steel and strip wound to form an inside diameter of 2½ inches and an outside diameter of 3½ inches, with a height of 1 inch. The windings on these toroidal cores might be on the order of 2100 turns of No. 21 gage wire for each secondary winding 25, 100 turns of No. 30 gage wire for each signal winding 26, and 400 turns of No. 30 gage wire for each bias circuit winding 27. It should be understood, of course, that these values are for the purpose of illustration only, and there is no intention to so limit the invention by such disclosure. It can be seen that the additional sets of windings 27 for each reactor are connected in series with resistor 28 and selenium rectifier CR3, and it is the function of this additional circuit to set the bias on the reactors 19, 20, and 21.

Referring still to Figure 2 of the drawing, it can be seen that three pairs of selenium rectifiers (CR4 and CR5; CR6 and CR7; and CR8 and CR9) are connected in circuits as shown in the basic circuit of Figure 1, and that resistors 31 to 36, inclusive, are provided as balancing resistors, and their function is to equalize the outputs of their amplifiers, resistors 32, 34, and 36 being adjustable.

Equalizing transformers 41, 42, and 43 are provided to give added gain to the system. Each of these transformers have the customary primary and secondary windings 44 and 45, respectively, and have a ratio of 1 to 1. Each primary winding 44 is connected in series circuit with the respective signal winding 26 of one saturable reactor, and each secondary winding 45 is connected in parallel with the respective secondary winding of one coupling transformer.

The operation of the repeater circuit, as shown in Figure 2 of the drawing, is similar to that described for the circuit of Figure 1 in that when no signal is being applied to terminals 51, 52, and 53, the alternating current that is being applied to terminals 61 and 62 will flow through each pair of selenium rectifiers and, as the currents reaching each coupling transformer 22, 23, and 24 will be equal and of opposite polarity, the currents will cancel in these coupling transformers, and consequently no voltage will appear across output terminals 54 to 56, inclusive. The operation of the repeater circuit, shown in Fig. 2, is based on the principle of comparing the output to the input and amplifying the difference of these signals to obtain an accurate output under all temperature variations encountered. The small difference required for full output is obtained by connecting the equalizing transformers 41, 42, and 43 in series with signal windings 26 so that the voltages on the equalizing transformers is subtracted from the input signal and the remainder of the input signal is applied to the control winding of the magnetic amplifier as an A. C. current and voltage. The primary of the transformer is connected across the output signal, therefore the push-pull A. C. amplifier will always function to bring the output voltage in correspondence with the input voltage in each amplifier. The equalizing transformers 41, 42, and 43, which each have a ratio of 1 to 1, are used for comparing the input and output voltages. The magnitude and polarity of the output voltage will be proportional to the magnitude and polarity of the transmitter signal. Thus it can be seen that the repeater circuit will accurately repeat any signal given by a transmitter to a load of one or more motors with a minimum of current drain from the transmitter and yet provide the necessary power for full torque on the motors that are to be driven.

Obviously many modifications and variations of the present invention are possible in the light of the above teachings. It is, therefore, to be understood that the invention may be practiced otherwise than as specifically described.

What is claimed is:

1. A control system for controlling the speed and direction of a motor comprising; a plurality of saturable reactors, each having a signal winding and a secondary winding having two output terminals and a common terminal; an intermittent signal voltage source connected to said signal windings of said saturable reactors; a plurality of selenium rectifiers connected in opposed relation one each to each said output terminal of said secondary windings; a plurality of coupling transformers, one each for each said saturable reactor, each said coupling transformer having a secondary winding and a primary winding with a center-tapped terminal and two input terminals, each said input terminal of each said transformer being connected to one each of said selenium rectifiers; a plurality of equalizing transformers, one each for each saturable reactor, each having a primary winding connected in series with the respective signal windings of said saturable reactors and each having a secondary winding connected in parallel with the respective secondary winding of said coupling transformer whereby the output voltage is compared with the input signal to improve gain and accuracy in said system; and a source of alternating current connected between said common terminals of said secondary windings of said saturable reactors and the respective center-tapped terminals of said coupling transformers whereby a signal voltage impressed on said signal windings causes unequal current flow through said rectifiers thereby producing an output voltage proportional to the magnitude and polarity of said signal voltage.

2. A control system as set forth in claim 1 wherein each of said saturable reactors includes means for setting a bias on said reactor.

References Cited in the file of this patent
UNITED STATES PATENTS
2,745,056 Zucchino May 8, 1956